United States Patent [19]

Russell

[11] Patent Number: 4,861,144

[45] Date of Patent: Aug. 29, 1989

[54] FIELD CORRECTION APPARATUS

[75] Inventor: James T. Russell, Bellevue, Wash.

[73] Assignee: Optical Recording Corporation, Toronto, Canada

[21] Appl. No.: 162,299

[22] Filed: Feb. 29, 1988

[30] Foreign Application Priority Data

Nov. 30, 1987 [CA] Canada ................................. 553063

[51] Int. Cl.$^4$ .......................................... G02B 26/10
[52] U.S. Cl. ..................................... 350/412; 350/6.3
[58] Field of Search ......................... 350/412, 6.3, 6.4

[56] References Cited

U.S. PATENT DOCUMENTS 3,881,801  5/1975  Bechtold ............................ 350/412
4,163,600  8/1979  Russell ................................ 350/6.3

FOREIGN PATENT DOCUMENTS 2022265  11/1971  Fed. Rep. of Germany .
2075843  10/1971  France .

Primary Examiner—Bruce Y. Arnold
Assistant Examiner—Rebecca D. Gass
Attorney, Agent, or Firm—Fleit, Jacobson, Cohn, Price, Holman & Stern

[57] ABSTRACT

An optical system is provided implementing a field correction apparatus. The system includes a rotating support driven by a motor. A plurality of focussing lenses are circumferentially spaced about the axis of rotation of the support. As the support rotates, each focussing lens successively passes over a record medium in an arcuate path. The support is also provided with a pyramidal distributing mirror having a number of reflecting surfaces. Each reflecting surface of the disturbing mirror is associated with one of the focussing lenses. The pyramidal distributing mirror is mounted on the center of the support and receives an optical beam on one of its reflecting surfaces. The optical beam is conveyed to the reflecting surface associated with the focussing lens passing over the record medium in a plane that includes the axis of rotation of the support. The optical beam is also directed to the reflecting surface at an angle to the axis of rotation. A field correction lens receives the reflected beam from the reflecting surface and refracts the optical beam so that the optical beam after emerging from the field correction lens follows a path substantially coincident with a radial line extending from the axis of rotation of the support to the optical axis of the focussing lens during the entire pass of the focussing lens over the record medium. A method of aligning an optical beam to become incident on the optical axis of a focussing lens is also provided.

20 Claims, 4 Drawing Sheets

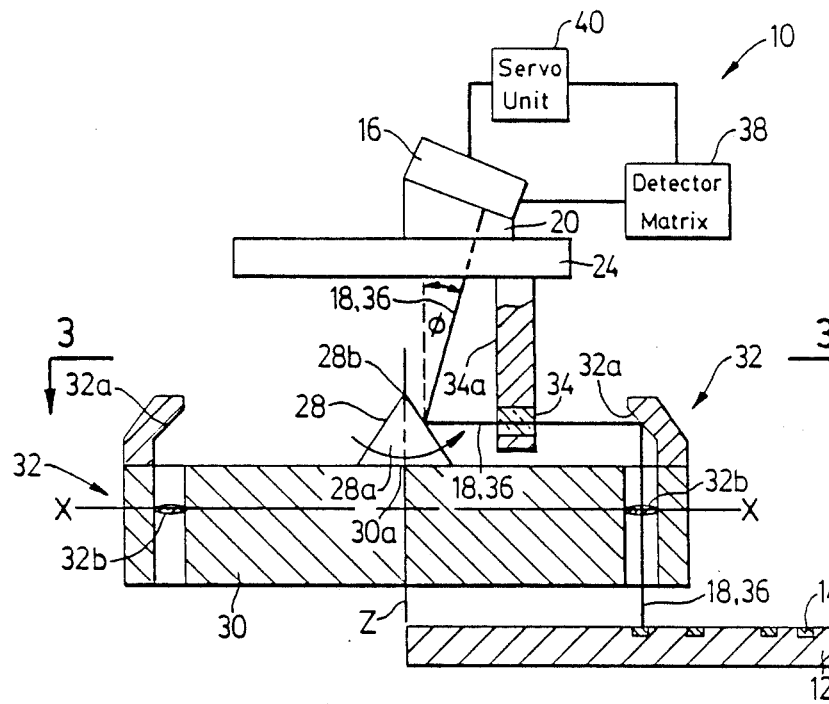
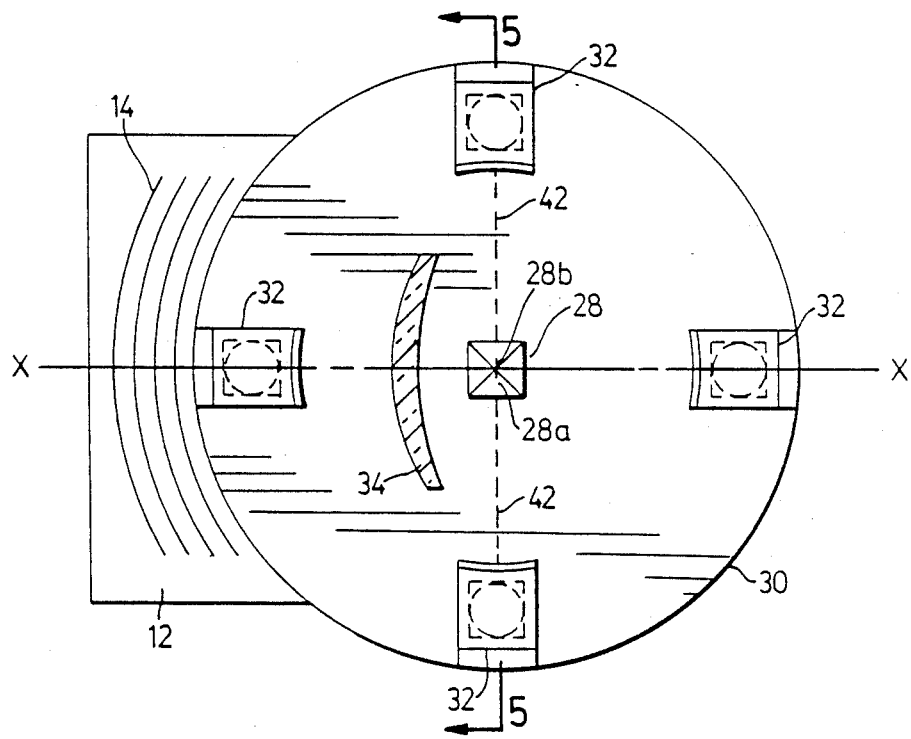

FIELD CORRECTION APPARATUS

The present invention relates to a field correction apparatus and in particular to a field correction apparatus for use in an optical recording and playback system.

Optical recording and playback systems are well known in the art. The optical system described in U.S. Pat. No. 4,163,600 to Russell shows a rotating drum having a number of turning mirror and objective lens pairs circumferentially spaced thereon. The rotating drum is also provided with a pyramidal distributing mirror located at the centre of the drum and having a number of triangular-shaped reflecting surfaces, each reflecting surface being associated with one of the turning mirror and objective lens pairs. As the drum rotates each triangular-shaped surface successively receives an optical beam and reflects the optical beam so that it is directed towards the associated turning mirror and objective lens pair that is passing over a data record. The turning mirror reflects the optical beam so that it passes through the objective lens which focusses the optical beam to a point on the data record. In this manner, digital data can be read from the record by examining the reflected optical beam therefrom.

Since, the optical beam is not incident at the centre of the distributing mirror, the optical beam will only be reflected towards the centre of the associated turning mirror and objective lens pair at the midpoint of the pass of the mirror and lens pair over the data record. To compensate for this, the optical beam is directed towards the triangular-shaped reflecting surfaces at a fixed back angle relative to the centre vertical axis of the rotating drum and pyramidal distributing mirror. The back angle imposed on the optical beam causes the optical beam to follow a path directly from the impingement point on the triangular-shaped surface to the centre of the turning mirror and objective lens pair, throughout the entire pass of the mirror and lens pair over the medium.

However, a problem exists in that the optical beam impinges on the turning mirror and objective lens pair at an angle to a radial line extending from the centre of the rotating drum to the centre of the turning mirror and objective lens pair except at the midpoint of the pass of the mirror and lens pair over the medium. The angle formed between the radial line and the optical beam during the pass of the mirror and lens pair over the data record results in non-optimum focussing of the objective lens thereby resulting in a loss of optical power in the system and increasing the probability of errors when reading data. Accordingly, there is a need for an improved field correction apparatus.

It is an object of the present invention to obviate or mitigate the above disadvantage.

support means rotatable about an axis and having at least one lens means spaced from said axis;

drive means rotating said support means about said axis;

a source for generating an optical beam;

optical distributing means to direct said optical beam from said source to said lens as said lens means passes across a record medium; and, field correction means receiving said optical beam from said distributing means and altering the path of said optical beam so that said optical beam between said field correction means and said lens means is substantially coincident with a line extending from the optical axis of said lens means to the axis of rotation of said support means.

Preferably, the field correction apparatus implements a low optical power positive lens to align the optical beam and is used in an optical recording and playback system thereby optimizing the performance of the object focussing lenses used to focus the optical beam on a record medium.

An embodiment of the present invention will now be described by way of example only with reference to the accompanying drawings in which:

FIG. 1 is a side view of an optical recording and playback apparatus implementing a field correction apparatus;

FIG. 3 is a top view of another portion of the device illustrated in FIG. 1 taken along the line 3—3;

FIG. 6b is a rotated top view of the portion illustrated in FIG. 6a; and

Figure 5:
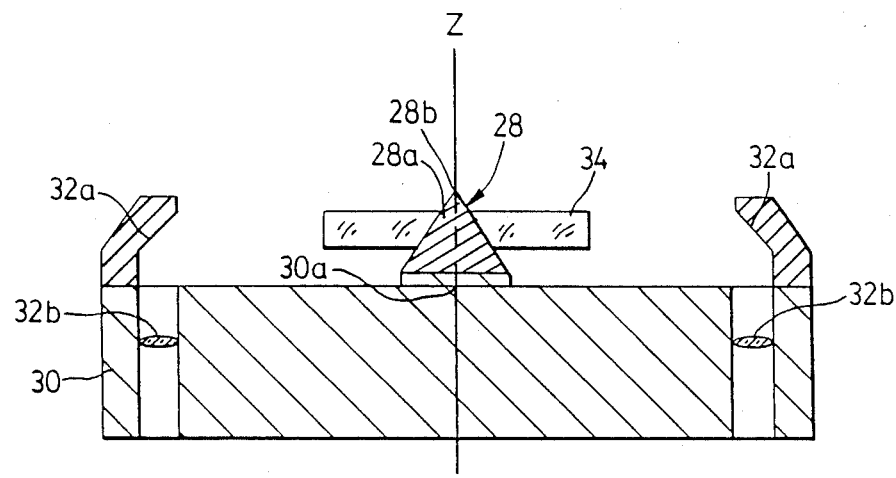
FIG. 5 is a sectional view of the portion illustrated in FIG. 3 taken along the line 4—4.
Figure 2:
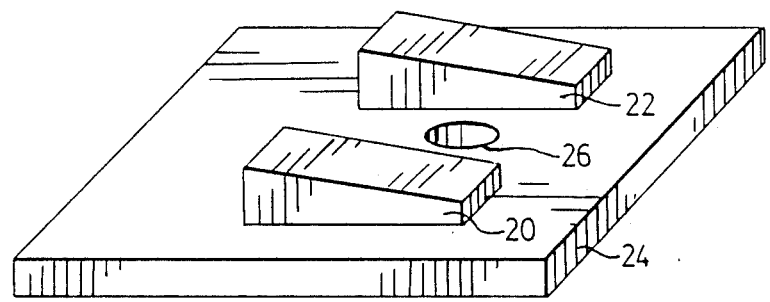
FIG. 2 is a perspective view of a portion of the device illustrated in FIG. 1.
Figure 4:
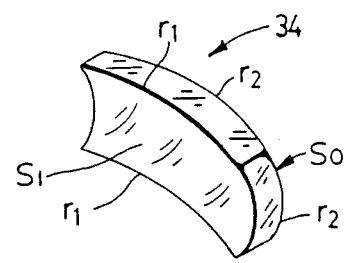
FIG. 4 is a perspective view of yet another portion of the device illustrated in FIG. 1.

Referring now to FIGS. 1 to 6, an optical recording and playback system 10 is shown. The system 10 which is similar to that shown in U.S. Pat. No. 4,163,600 to Russell is for recording or reading digital data tracks 14 on or from a record medium 12.

Referring to the system 10, an optical head 16 for generating a monochromatic optical beam 18 is shown and connected to a pair of angled supports 20 and 22 respectively by a number of suitable fasteners (not shown). The supports 20 and 22 are located on a base 24 and separated so as to provide support near each side of the optical head 16 and along the entire length thereof. A hole 26 is provided in the base 24 and is located between the two supports 20 and 22. The hole 26 is positioned in a manner to allow the optical beam 18 generated by the optical head 16 to pass therethrough. The angled supports 20 and 22 have a 5° angle of inclination, thereby tilting the optical head 16 so that the optical beam 18 is directed through the hole 26 at a 5° angle $\phi$ relative to the centre axis Z of the system 10, the purpose of which will be set out in more detail hereinafter.

A pyramidal distributing mirror 28 which has a number of triangular shaped reflecting surfaces 28a for reflecting the optical beam 18 is positioned beneath the base 24. The distributing mirror 28 is supported on a rotatable drum 30 located above the record medium 12 and positioned such that the top 28b of the distributing mirror 28 aligns over the centre 30a of the drum 30. Furthermore, the drum 30 and distributing mirror 28 are positioned so that the centre 30a and the top 28a and hence, the axis of rotation of the drum 30 and distributing mirror 28 is coincident with the centre axis Z.

A plurality of turning mirror and objective lens pairs 32 are circumferentially spaced about the drum 30. Each mirror and lens pair 32 comprises a turning mirror 32a and an objective lens 32b and is associated with one of the reflecting surfaces 28a. The mirror and lens pairs 32 are arranged such that when the drum 30 is rotated, only one mirror and lens pair 32 is located over the record medium 12. A field correction lens 34 which is fastened securily to the base 24 by a mounting block 34a is positioned over the drum 30 and located between the distributing mirror 28 and the mirror and lens pair 32 passing over the record medium 12. The optical beam 18 is directed and aligned by the distributing mirror 28 and the field correction lens 34 towards the mirror and lens pair 32 passing over the medium 12. The mirror and lens pairs 32 serve to direct and focus the optical beam 18 on the record medium 12.

The reflected beam 36 from the record medium 12 passes back through the mirror and lens pair 32 and field correction lens 34 to the distributing mirror 28. From the distributing mirror 28, the reflected beam 36 is directed back through the hole 26 and is received by the optical head 16. The optical head 16 which is well known in the art comprises a light detector array and a focussing and tracking lens (not shown). In this manner, data recorded on the record medium 12 can be read therefrom by examining the reflected optical beam 36 and by adjusting the position of the optical beam 18 on the medium. To facilitate the movement of the optical beam 18, the system 10 is also provided with a detector matrix 38 for generating focus and tracking error signals and a servo-unit 40 which are well known in the art and will not be discussed hereinafter.

Referring now to the field correction lens 34, as can be seen the field correction lens 34 is a low optical power meniscus lens of normal spherical shape having an inner radius $r_1$ of curvature and an outer radius $r_2$ of curvature to define an inner concave surface $S_I$ and an outer convex surface $S_O$. The field correction lens 34 is positioned so that the optical beam 18 reflected from the distributing mirror 28 is incident on the inner concave side $S_I$ and emerges from the outer side $S_O$. The the optical beam 18 proceeds to the mirror and lens pair 32 passing over the record medium 12 after the optical beam emerges from the field correction lens 34. The field correction lens 34 is symmetrical about a vertical plane and is positioned in the system 10 so that the horizontal axis X of the vertical plane is coincident with a radial line 42 extending from the centre 30a of the drum to the centre of the mirror and lens pair 32 passing over the record medium 12, when the mirror and lens pair 32 is positioned at the midpoint of its pass over the record medium. The field correction lens 34 is formed from glass type BK7 manufactured by Schott and provided with one-quarter wavelength coatings to allow the optical beam 18 to pass therethrough with minimum reflection.

The operation of the system 10 will now be described with particular emphasis on the operation of the field correction lens 34. When it is described to read or write a track 14 of digital data from or on the record medium 12, the optical head 16 which is fastened to the base 24 via the angled supports 20 and 22, generates the optical beam 18, the optical beam 18 of which will have an intensity depending on whether tracks 14 of data are to be written or read. The supports 20 and 22 which have an angle of inclination approximately equal to 5°, cause the optical beam 18 to be aimed through the hole 26 at the 5° angle $\phi$ with respect to the centre axis Z of the system 10. The 5° angle in conjunction with the field correction lens 34 are for use in optimizing the performance of each mirror and lens pair 32, the details of which are set out in more detail hereinafter.

The optical beam 18 after passing through the hole 26 impinges on the triangular-shaped surface 28a of pyramidal distributing mirror 28 that is associated with the mirror and lens pair 32 passing over the record medium 12 at a distance d displaced from a radial line 42 extending from the optical axis of the focussing lens 32b to the axis of rotation Z of the drum 30. As mentioned previously, the optical beam 18 is located in a plane which includes the axis of rotation of the drum 30 and the distributing mirror 28. Following this, the optical beam 18 is reflected and aimed towards the concave surface $S_I$ of the field correction lens 34. The 5° angle $\phi$ imposed on the optical beam 18 causes the optical beam 18 to be directed towards the back edge 44 of the mirror and lens pair 32 during the first half of the pass over the record medium 12 and towards the leading edge 46 of the mirror and lens pair 32 during the next half of the pass thereover. The field correction lens 34 receives the optical beam 18 from the distributing mirror 28 throughout the entire pass of each mirror and lens pair 32 over the record medium 12 and refracts the optical beam 18 so that it follows a path from the field correction lens 34 to the turning mirror and objective lens pair centre that is coincident with the radial line 42. and impinges on the optical axis of the focussing lens 32b.

Figure 6A:
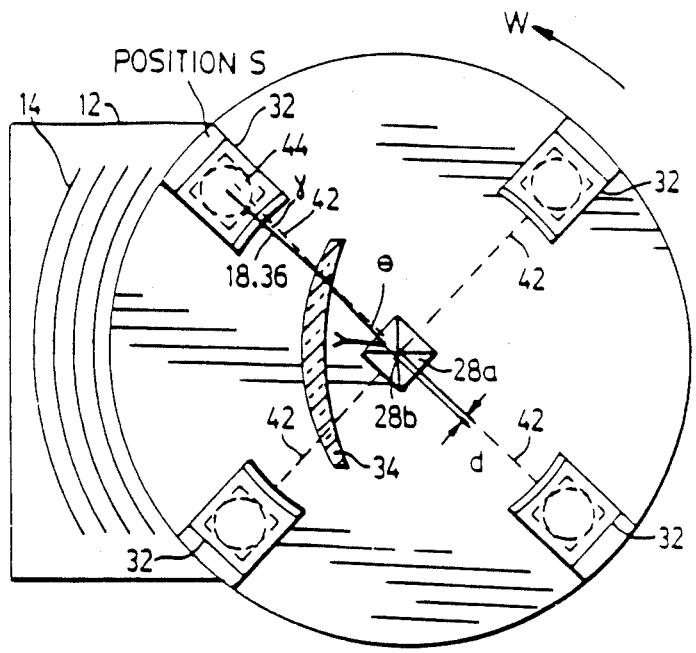
FIG. 6a is a top view of a portion of the device illustrated in FIG. 1.
Figure 6B:
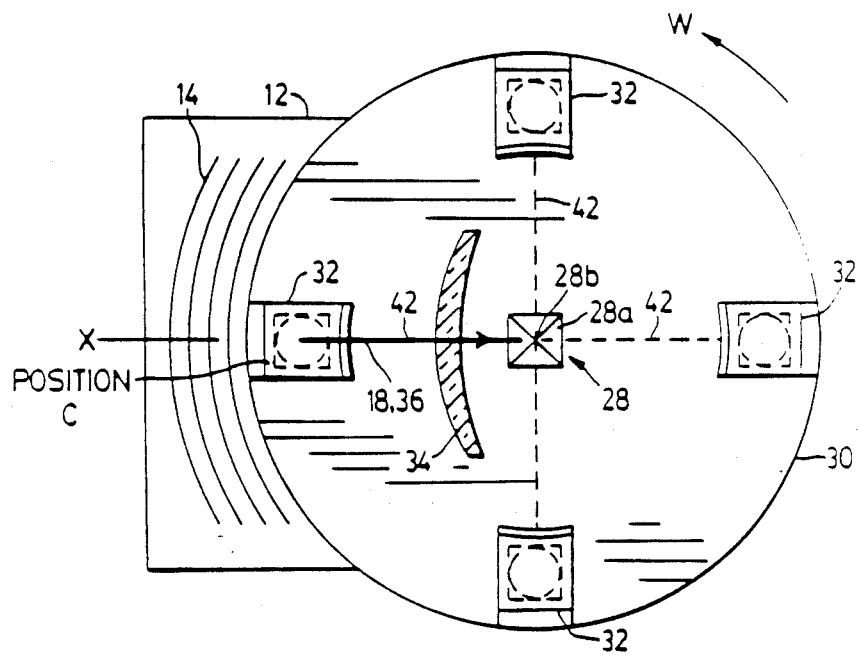
Figure 6C:
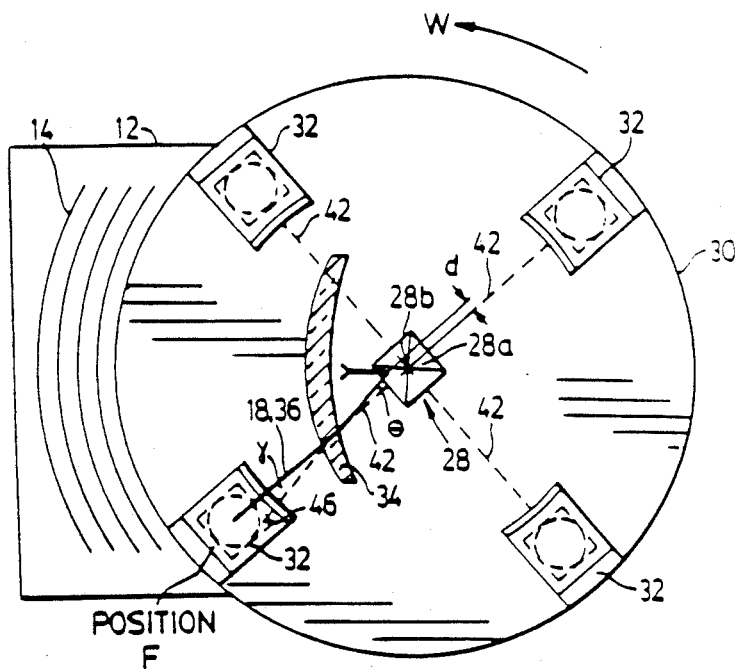
FIG. 6c is yet another rotated top view of the portion illustrated in FIG. 6b.

FIGS. 6a, 6b and 6c illustrate the path of the optical beam 18 beginning from the optical head 16 to the centre of one mirror and lens pair 32 for the starting S, the centre C and the finishing F positions during a trace across the record medium 12 as the drum 30 rotates. When a mirror and lens pair 32 is beginning a pass over the record medium 12 as indicated at position S, the optical head 16 generates the optical beam 18 which is directed towards the reflecting surface 28a of the pyramidal distributing mirror 28 at the 5° angle $\phi$ relative to the centre axis Z of the system 10. The optical beam 18 is reflected from the reflecting surface 28a towards the lagging edge 44 of the mirror and lens pair 32 due to the angle 0 formed between the optical beam 18 and the radial line 42.

The 5° back angle $\phi$ and hence the resulting reflecting angle 0 are chosen so that the optical beam 18 crosses the radial line 42 slightly after impinging on the concave side $S_I$ of the field correction lens 34 during the entire pass of the mirror and lens pair 32 over the medium 12. When the optical beam 18 impinges on the field correction lens 34, it is refracted by an angle $\gamma$ so that the emerging optical beam 18 follows a path to the mirror and lens pair 32 that is coincident with the radial line 42. Thereafter, the optical beam 18 is directed and focussed optimally on the record medium 12 via the mirror and lens pair 32, thereby allowing the data to be recorded thereon or to be read therefrom.

As the drum 30 continues to rotate in direction W, the mirror and lens pair 32 passing over the record medium 12 travels from the starting position S towards the centre position C. Due to the positioning of the optical head 16, the angle 0 formed between the radial line 42 and the optical beam 18 steadily decreases. Thus, the angle of refraction $\gamma$ imposed on the optical beam 18 by the field correction lens 34 steadily decreases so that the emerging optical beam 18 from the correction lens 34 remains coincident with the radial line 42. When the mirror and lens pair 32 reaches the centre position C, the angle 0 and the angle of refraction $\gamma$ are equal to 0° since the optical beam 18 reflected from the surface 28a is coincident with the radial line 42. As mentioned previously, the field correction lens 34 is positioned so that the focal line or plane of symmetry thereof is coincident with the radial line 42 at the centre position C and thus, the optical beam 18 is not refracted at this position.

As the drum 30 rotates even further, and the mirror and lens pair 32 moves from the centre position C towards the finishing position F, the angle 0 formed between the optical beam 18 and the radial line 42 steadily increases thereby directing the optical beam 18 towards the leading edge 46 of the mirror and lens pair 32. Similarly, the field correction lens 34 refracts the optical beam 18 so that it emerges from the field correction lens 34 following a path coincident with the radial line 42. As can be seen, the back angle φ imposed on the optical beam 18 and the field correction lens 34, serve to refract the optical beam 18 so that it is directed to the mirror and lens pair 32 following a path that is coincident with the radial line 42 during the entire trace of the mirror and lens pair 32 across the record medium 12. In effect, the field correction lens 34 creates a virtual image of the impingement point of the optical beam 18 on the pyramidal distributing mirror surface 28a on the radial line 42 and preferably at the centre axis Z during the entire trace of the mirror and lens pair 32 across the record medium 12, thereby in effect removing the displacement distance d from the system 10.

When the mirror and lens pair 32 has completed an arcuate pass over the record medium 12 and the next mirror and lens pair 32 is to begin a pass thereover, the same process is used to ensure that the optical beam 18 follows a path coincident with the radial line during the entire pass of the next mirror and lens pair 32 over the record medium 12.

To optimize the design of the field correction lens 34, the Code V program developed by Optical Research and Associates was used. Since, the field correction lens 34 does cause some spherical aberrations to the optical beam 18 it was desired to use a field correction lens having a low optical power to reduce the effects on the shape of the optical beam 18. However, since the field correction lens 34 had to remain between the pyramidal mirror 28 and the mirror and lens pairs 32, the radial distance of the mirror and lens pairs 32 from the centre 30a of the drum 30 was a design constraint.

Furthermore, the displaced distance d of the impingement point of the optical beam 18 from the radial line 42 was also a design constraint, since the correction lens 34 is designed to move the impingement point so that the displacement distance d is effectively removed from the system. However, since the servounit 40 of the system 10 adjusts the direction of optical beam 18 from the optical head 16, the distance d can vary slightly. Thus, an average value of the distance d was used as a design constraint, the distance d of which depends on the size of the distributing mirror 28 and the position on the mirror surfaces 28a at which the optical beam 18 is aimed.

The magnitude of the back angle φ was also a constraint in designing the lens, since the back angle φ determines the distance from the mirror and lens pair 32 at which the optical beam 18 crosses the radial line 42. The 5° back angle was chosen so that the intersection of the optical beam 18 and the radial line 42 occurred near the mirror and lens pair 32, thereby allowing the optical power of the field correction lens 34 to be minimized.

In choosing materials for optimizing the field correction lens 34 which were also design constraints when using the Code V program, a workable material having good optical qualities was required since inner and outer radii of curvature $r_1$ and $r_2$ of the spherrically shaped field correction lens 34 are small. In view of this, BK7 type glass was chosen together with suitable coatings to provide an efficient field correction lens.

Although, the Code V program was used to optimize the design of the field correction lens so that it performed the desired function whilst maintaining a fixed focal spot size, a number of other design programs can be used. Furthermore, other glass types, other lens materials and a various number of coatings therefor can be used to fabricate a field correction lens 34 which will function in a similar manner.

The present system overcomes the difficulties encountered in the prior art system by providing a field correction apparatus which adjusts the path of the optical beam 18 so that it is directed to towards the mirror and lens pair 32 during its entire trace over the record medium 12 following a path coincident with the radial line 42 to impinge on the optical axis of the focussing lens 32b. In this manner, the objective lens 32b of each mirror and lens pair 32 functions optimally when receiving the optical beam 18 thereby reducing the losses of optical power in the system.

It should be noted that the magnitude of the back angle φ imposed on the optical beam 18 can be altered provided the optical power and position of the field correction lens 34 is altered accordingly to produce the same desired result. Furthermore, the back angle φ need not be imposed on the optical beam using angled supports but can be imposed thereon by using reflective elements or by adjusting the position of the reflective components in the optical head 16 generating the optical beam 18.

It should also be noted that the field correction lens 34 can be formed using other types of lenses such as molded lenses formed from both glass and plastic, holographic lenses, optical element lenses and multi-element lenses comprising doublet or triplet lens structures whilst still achieving the same results. The use of the multi-element lenses provides the advantage of reducing the spherical abberations referred to previously, however, an increase in the cost of the lens results.

Also, it should be noted that various types of rotating distributing elements can be used such as polygonal or other various shaped distributing mirrors and various shaped holographic distributing elements having reflecting or transmitting surfaces. Moreover, although this system has been described using a monochromatic optical beam, the field correction lens can be designed to align the optical beam in the manner previously described as well as to reduce chromatic abberations thereof if a broad band light source is used.

Although, the field correction lens 34 has been described for use in an optical recording and playback system, it should be apparent to one skilled in the art that the field correction apparatus can be modified and incorporated into any optical system wherein compensation for the angle of reflection of an optical beam from a rotating surface is required.

We claim:
1. An optical system comprising:
support means rotatable about an axis and having at least one lens means spaced from said axis;
drive means rotating said support means about said axis;
a source for generating an optical beam;
optical distributing means to direct said optical beam from said source to said lens as said lens means passes across a record medium; and field correction means receiving said optical beam from said distributing means and altering the path of said optical beam so that said optical beam between said field correction means and said lens means is substantially coincident with a line extending from the optical axis of said lens means to the axis of rotation of said support means.

2. The optical system as defined in claim 1 wherein said field correction means alters the path of said optical beam via refraction.

3. The optical system as defined in claim 2 wherein said field correction means is in the form of a single low optical power positive lens.

4. The optical system as defined in claim 3 wherein said lens is formed from glass.

5. The optical system as defined in claim 2 wherein said optical distributing means is disposed on said support means and includes a reflecting surface associated with said lens means, said optical beam being directed towards said optical distribution means at an angle to said axis of rotation, said optical beam impinging on said reflecting surface when said lens means is passing across said record medium to define an impingement point, said point and said axis of rotation being non-coincident.

6. The optical system as defined in claim 5 wherein said optical beam proceeds directly from said reflecting surface to said lens means via said field correction means.

7. The optical system as defined in claim 5 comprising a plurality of lens means circumferentially spaced on said support means about said axis of rotation, each of said lens means successively passing across said record medium as said support means rotates, said distributing means including a plurality of reflecting surfaces, each of said reflecting surfaces being associated with one of said lens means, the reflecting surface associated with said lens means passing across said record medium receiving said optical beam from said source.

8. The optical system as defined in claim 7 wherein said support means is a cylindrical drum having a planar surface and said optical distributing means is a pyramidal distributing mirror disposed on said planar surface at the centre thereof, said reflecting surfaces being triangular-shaped to form a 45° angle with respect to said planar surface and positioned to reflect said optical beam toward said field correction means upon reception thereof.

9. The optical system as defined in claim 8 wherein each of said lens means includes an objective lens focussing said optical beam to a small diameter point on said record medium.

10. The optical system as defined in claim 7 wherein said angle is fixed at a predetermined magnitude, said angle lying in a plane that includes said axis of rotation and a radial line extending from the optical axis of said lens means to said axis of rotation of said support means when said lens means is at the midpoint of its pass across said record medium.

11. The optical system as defined in claim 10 wherein said angle has a magnitude of 5°.

12. The optical system as defined in claim 11 wherein said positive lens is symmetrical about a vertical plane, said lens being positioned so that the horizontal axis of said vertical plane is coincident with a radial line extending from said axis of rotation of said support means to the optical axis of said lens means when said lens means is at the mid-point of its pass across said record medium.

13. The optical system as defined in claim 13 wherein said lens is spherical.

14. A method of aligning an optical beam in an optical system comprising the steps of:
generating an optical beam;
directing said optical beam to an optical distributing means;
spacing at least one lens means from an axis;
rotating said lens means about said axis;
directing said optical beam from said distributing means towards said lens means as said lens means is rotated to pass across a record medium; and
altering the path of said optical beam so that said optical beam is coincident with a line extending from the optical axis of said lens means to said axis of rotation of said lens means when said optical beam arrives at said lens means.

15. The method of claim 14 further comprising the step of refracting said optical beam so that said beam becomes coincident with said line.

16. The method of claim 15 further comprising the step of directing said optical beam toward said distributing means at an angle to said axis of rotation of said lens means.

17. The method of claim 16 further comprising the step of directing said optical beam at a fixed predetermined angle with respect to said axis of rotation of said lens means, said angle lying in a plane including said angle of rotation and a radial line extending from the optical axis of said lens means to the axis of rotation of said lens means when said lens means is at the mid-point of its pass across said record medium.

18. The method of claim 17 further comprising the step of directing said optical beam towards said optical distributing means at a 5° back angle with respect to the axis of rotation of said lens means.

19. The method as defined in claim 15 further comprising the step of refracting said optical beam via a low optical power positive lens.

20. The method of claim 19 further comprising the step of forming said positive lens from glass.

* * * * *